United States Patent [19]

Keough et al.

[11] Patent Number: 4,956,152
[45] Date of Patent: Sep. 11, 1990

[54] EMISSION CONTROL UNIT

[75] Inventors: James R. Keough, Edmonds; Arthur E. Miller, Renton; Charles R. Schrader, Seattle, all of Wash.

[73] Assignee: Electro Statics, Inc., Seattle, Wash.

[21] Appl. No.: 350,125

[22] Filed: May 10, 1989

[51] Int. Cl.⁵ ............................................. F01N 3/15
[52] U.S. Cl. ............................. 422/181; 422/186.21; 422/907; 55/131; 55/DIG. 30; 60/275; 60/282; 60/299
[58] Field of Search ............... 60/275, 282, 299; 55/DIG. 30, 131; 423/213.2, 213.5, 244, 215.5; 422/186.21, 907, 181

[56] References Cited

U.S. PATENT DOCUMENTS

| | | |
|---|---|---|
| 895,729 | 8/1908 | Cottrell. |
| 3,157,479 | 11/1964 | Boles ............................ 55/146 |
| 3,847,572 | 11/1974 | Hishinuma et al. ............ 55/179 |
| 4,183,829 | 1/1980 | Adachi et al. ............... 423/213.5 |
| 4,313,739 | 2/1982 | Douglas-Hamilton ............ 55/2 |
| 4,649,703 | 3/1987 | Dettling et al. .............. 60/275 |

FOREIGN PATENT DOCUMENTS

| | | | |
|---|---|---|---|
| 0256325 | 2/1988 | European Pat. Off. ......... | 60/299 |
| 116744 | 5/1988 | Japan ......................... | 423/213.5 |
| 1283429 | 1/1987 | U.S.S.R. ..................... | 60/275 |

Primary Examiner—Bernard Nozick
Attorney, Agent, or Firm—Bruce A. Kaser

[57] ABSTRACT

An emission control unit is mounted in the exhaust line of a fossil fuel internal combustion engine and includes a tubular housing in which a lime sleeve is received. The sleeve has an axial opening through which a corona wire extends. Exhaust gasses pass through the sleeve along the wire. Placing a charge on the wire drives pollutants in the exhaust laterally outwardly into the sleeve at a direction which is 90° to the direction of exhaust travel. The sleeve chemically interacts with the pollutants and neutralizes them with little hazard to the environment.

14 Claims, 3 Drawing Sheets

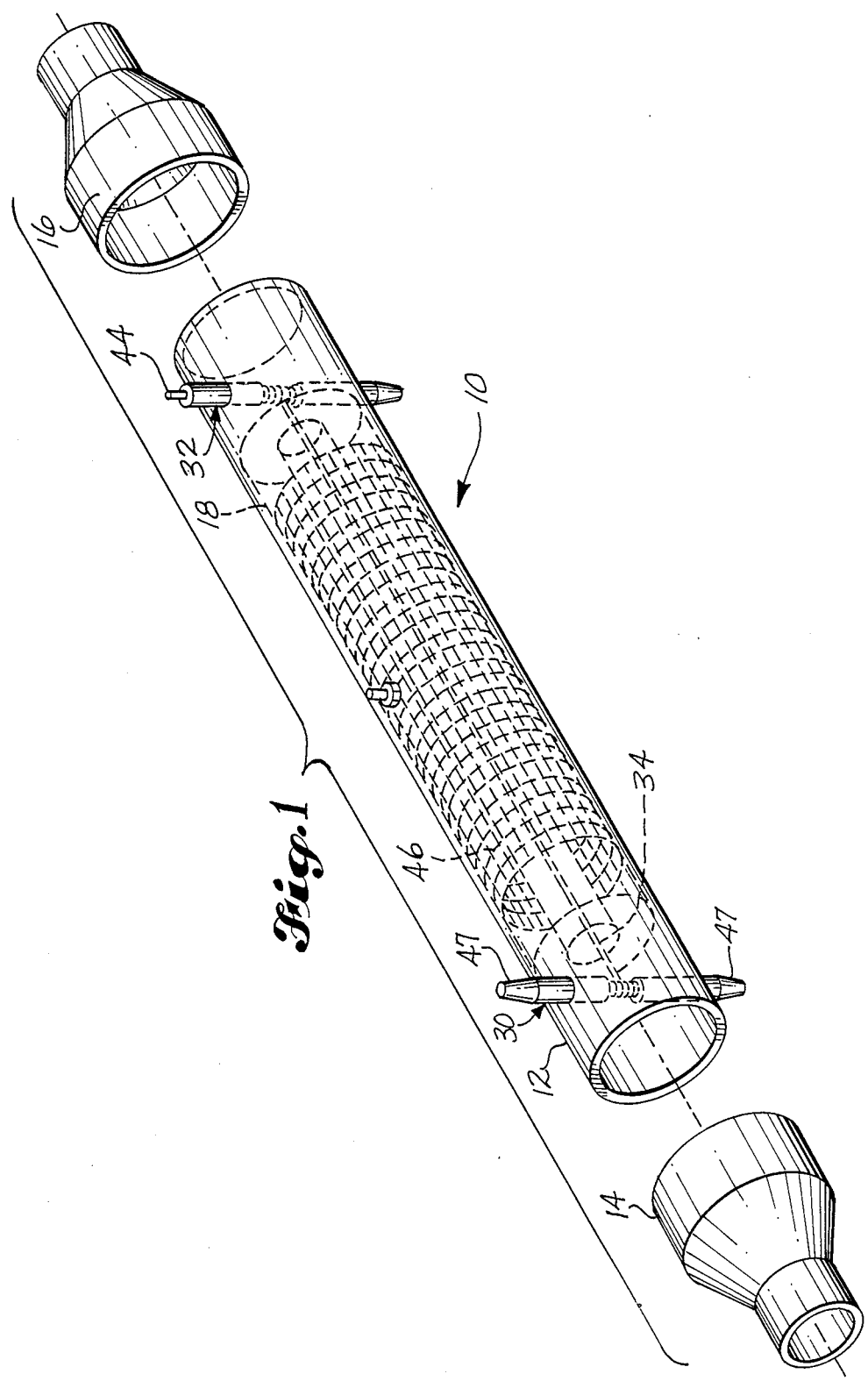

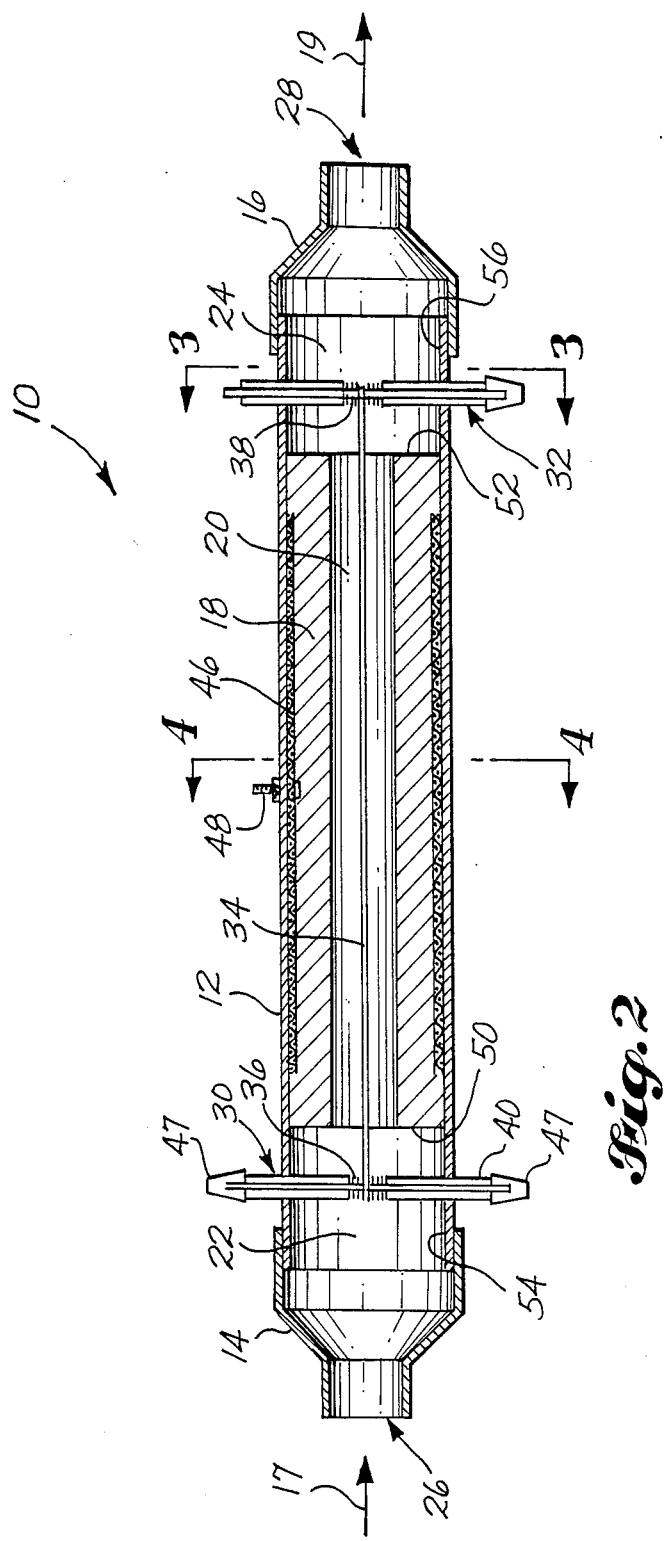

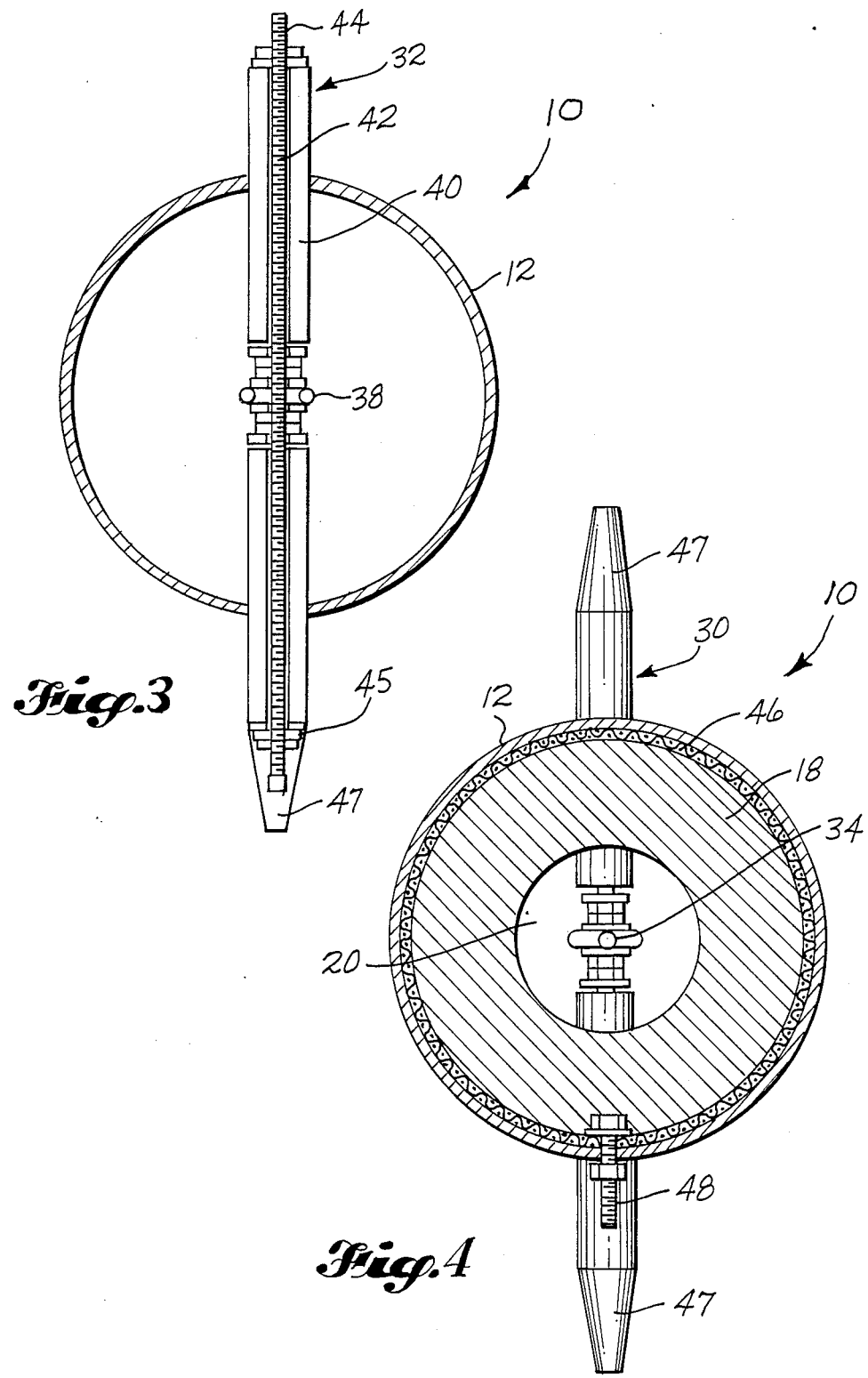

EMISSION CONTROL UNIT

TECHNICAL FIELD

This invention generally relates to emission control devices for use in conjunction with vehicles and/or internal combustion engines. More particularly, the invention relates to a device which is installable in the exhaust line of an internal combustion engine and removes certain pollutants from the engine's exhaust.

BACKGROUND ART

The environmental problems created by automotive pollution are well known. According to E.P.A. estimates, 45% of all acid rain and smog is caused by internal combustion engines. For this reason, there has been a long-felt need to develop devices which can significantly reduce pollution caused by automotive exhaust.

The exhaust gas of a gasoline or diesel engine typically contains high levels of $SO_x$, $NO_x$, $HNO_3$ and $H_2SO_4$. Certain attempts have been made to develop devices which can remove these pollutants, the most notable example being the electrostatic precipitating device disclosed in U.S. Pat. No. 3,157,479 issued to Boles on Nov. 17, 1964. This device addresses the problem of removing exhaust pollutants in a manner which is similar to the invention disclosed here. However, Boles' device does not address removal and disposal of pollutants in an environmentally sound manner, which is the key difference between the present invention and Boles.

Other than the present invention, no prior art devices are known which can effectively remove significant amounts of these kinds of pollutants in a cost-effective manner with little or no detrimental side-effect on the environment.

SUMMARY OF THE INVENTION

The invention is an emission control unit which has the capability of removing all or at least a significant portion of the above-identified pollutants from internal combustion engine exhaust. The invention includes a tubular housing having an inlet end and an outlet end, the housing and its ends being sized for insertion directly in an exhaust line. Received within the housing is a cylindrical sleeve made of a material whose chemical composition is such that it can chemically interact with and neutralize exhaust pollutants. Preferably, such material would be mostly calcium carbonate (commonly known as lime). The sleeve has an axial opening in its center that extends along its entire length. This opening defines a gas flow passageway between the housing's ends.

The sleeve is generally shorter than the length of the housing which provides a space inside the housing adjacent opposite ends of the sleeve. Positioned in each space is an electrical terminal which extends transversely through the housing. A corona wire interconnects the terminals by extending axially through the sleeve's axial opening in the direction of gas flow. A charge is placed on this wire as exhaust gasses pass through the sleeve adjacent the wire.

The pollutants in the exhaust are mostly ionized, which means they are charged. The charge on the corona wire repels them into the sleeve where they chemically interact with the material making up the sleeve, and are neutralized. When the sleeve becomes saturated with pollutants, the unit can be removed from the exhaust line and disposed with little or no detrimental effect on the environment. A sleeve whose composition is lime will have been chemically altered into mostly gypsum, and it is possible that such sleeve could be recycled for a number of uses including plaster of Paris, agricultural lime, plasterboard, cement processing for roads and structures, paint, filters, insulation and/or wall plaster.

The features and operation of the invention will become better understood upon consideration of the following description taken in conjunction with the drawings.

BRIEF DESCRIPTION OF THE DRAWINGS

In the drawings, like reference numerals refer to like parts throughout the various views, and wherein:

FIG. 1 is an exploded pictorial view of an emission control unit constructed in accordance with a preferred embodiment of the invention;

FIG. 2 is a side view of the unit shown in FIG. 1 taken in section;

FIG. 3 is a cross-sectional view taken along line 3—3 in FIG. 2; and

FIG. 4 is a cross-sectional view like FIG. 3 but is taken along line 4—4 in FIG. 2.

BEST MODE FOR CARRYING OUT THE INVENTION

Referring now to the drawings, and first to FIG. 1, therein is shown at 10 an emission control unit constructed in accordance with the current preferred embodiment of the invention. The unit 10 includes a tubular or cylindrical housing which will be hereafter referred to as an outer jacket 12. The jacket's ends are covered by caps 14, 16. Preferably, the jacket 12 and caps 14, 16 are all made of a non-conductive high temperature resistant material, such as high temperature plastic.

One cap 14 defines an inlet end of the unit 10, and the other 16 defines an outlet end. The unit 10 is placed in an exhaust line in a conventionally-known manner much like a muffler. Exhaust gas would pass through the unit as indicated by arrows 17, 19 in FIG. 2.

Received within jacket 12 is, by way of nonlimitive example, a calcium carbonate (lime) sleeve 1B. As is shown in FIG. 2, this sleeve 18 has an axial opening 20 extending through its entire length which interconnects end spaces 22, 24 at opposite ends. These spaces 22, 24 are, of course, in airflow communication with openings 26, 28 in caps 14, 16.

Positioned in each end space 22, 24 is a terminal member or terminal 30, 32 which extends through its respective end space. A corona wire 34 interconnects terminals 30, 32. Except where the corona wire 34 is physically connected at each end 36, 38 to its respective terminal 30, 32, the terminals are covered by a suitable insulating material 40. The terminal-to-corona connection should also be sealed with a temperature or heat resistant material which would provide additional insulation at the connection. Such a material could be an epoxy material, for example. By way of nonlimiting example, the terminals' insulation 40 should be able to insulate against an electrical potential of 40 kV.

As is shown in FIG. 3, each terminal 30, 32 is preferably in the form of a threaded rod 42. A negative charge is placed on the corona wire 34 by making suitable electrical connections to the rod's end 44. This could be accomplished by a nut 45 threaded onto the end 44. Those ends of the rods which are not used to make such connection are covered by cap insulators 47.

The unit 10 is grounded by a wire screen 46 which surrounds the sleeve 18 and is positioned inbetween the sleeve and outer jacket 12. Grounding is accomplished by electrical connection to a ground bolt connector 48. In FIG. 2, the ground bolt connector 48 is shown positioned on the upper part of outer jacket 12. In FIG. 4, the connector 48 is shown rotated 180° and a person skilled in the art would realize that this connector could be positioned at many locations on the unit 10.

In FIG. 2, the lime sleeve's outer axial ends 50, 52 and the inner wall surfaces 54, 56 of the jacket end spaces 22, 24 must all be coated with a heat resistant material in much the same fashion as was previously described for the terminals 30, 32. This coating is not shown in the drawings.

In operation, electrical power may be provided to the unit 10 by a conventional solid state induction coil high voltage supply which would be negatively rectified and filtered. Two wires from the power source would be connected to the unit 10. The negative wire would be connected to one of terminals 30, 32, and the positive wire would be connected to ground bolt connector 48. This connection would result in a negative charge being placed on corona wire 34.

An exhaust gas moves through passageway 20 in sleeve 18, acid components such as $SO_x$, $NO_x$, $HNO_3$, $H_2SO_4$ are ionized and hence move in the field laterally into the sleeve 18. In addition, certain particulates in the exhaust gas stream may have a net charge independent of the effect of he corona wire, and would therefore be laterally displaced upon entering the electric field created by the negatively charged corona wire. It should also be recognized that dissociation of the acid gasses may occur subsequent to ionization. Such dissociation could result in the formation of neutral species including elemental sulfur, nitrogen and oxygen.

The positive ground around the sleeve also helps to attract these pollutants into the sleeve. The negative chemical structure of the pollutants is altered by the sleeve into mostly a neutral salt, i.e. gypsum. It has been discovered that adding iron oxide to the lime may act as a catalyst thus facilitating this reaction, and thereby increasing the sleeve's absorbent capabilities.

Iron oxide has been found to be an effective catalyst that enhances the operation of the unit 10. However, it should be understood that other metals or metal oxides could be used effectively.

Assuming the unit 10 is used in conjunction with an internal combustion engine, as the engine increases its RPMs and produces greater volumes of exhaust, the electrical charge placed on the corona wire would be proportionately increased to dispose of the increased pollutant load.

Preferably, the corona wire 34 is made of titanium because of the highly acidic nature of the pollutants which pass through the unit 10. The grounding screen 46 should be made of a suitable conductive material that is not amenable to corrosion. Stainless steel would be a suitable material although there are probably cheaper materials which would be just as suitable.

Current test results have shown that the unit 10 operates well when a D.C. voltage in the range of 12 kilovolts to 25 kilovolts is placed across one of terminals 30, 32 and the ground bolt connector 48. Further testing may demonstrate that high frequency voltages may be effectively used in conjunction with the unit 10. This assumes an approximate sleeve diameter of 4 to 6 inches.

The invention as disclosed herein is known to be effective in removing pollutants from exhaust. As of the present date, it is still undergoing research and development work which should ultimately improve its performance. Part of this will involve altering the nature and magnitude of the voltages applied to the corona wire 34 and the screen 46. It may be subsequently discovered, for example, that the unit's performance can be improved by changing the voltages described above.

Nevertheless, the preferred embodiment of the subject invention has been reduced to practice. Table 1 below contains data showing the percentage removal of three acid gasses ($SO_2$, $NO_2$, and NO) from the exhaust stream of a 4-cylinder gasoline engine manufactured by Toyota Motor Co. These data were obtained over the course of several months using a tube colorimetric assay. Percent removal was determined by measuring concentrations for the three gasses at the inlet and outlet ends of the ECU device.

TABLE 1

| Percent removal of acid gasses from automotive exhaust by Electro Statics ECU device. | | | | |
| --- | --- | --- | --- | --- |
| Test Date: | 4/28/87 | 4/30/87 | 5/28/87 | 12/27/87 |
| Operating Voltage: | 25 kV | 20 kV | 10.9 kV | 12.4 kV |
| Compound: | | | | |
| $SO_2$ | 55.6% | 87.5% | 87.5% | 97.0% |
| $NO_2$ | 73.9% | 86.0% | 73.3% | 90.0% |
| NO | 70.0% | 60.0% | 50.0% | 50.0% |

While these removal rates are typical of those obtained during this period in the proof of principle demonstration, the device has achieved $SO_2$ removal as high as 100%.

Further, it is conceivable the chemical makeup of the sleeve 18 could be altered without departing from the spirit and scope of the invention. Subsequent tests may show that different grades of calcium carbonate could be used in the sleeve, some more effective than others, or different combinations of calcium carbonate and metal catalysts could be used, also with variable effectiveness. It is further possible a sleeve material other than calcium carbonate could be developed which functions in a chemically equivalent manner. The disclosure made herein is the best known way of carrying out the invention at its current stage of development.

Thus, having described a preferred embodiment for carrying out the invention, it is to be appreciated the emission control unit 10 described above could be altered in many ways without departing from the spirit and scope of the invention. The invention is not to be limited in any way or form by the above description, but rather is to be limited only by the subjoined patent claims, wherein such claims are to be interpreted in accordance with the established doctrines of patent claim interpretation.

What is claimed is:

1. An emission control unit for use in removing certain pollutants, including $SO_x$ and $NO_x$, from an exhaust gas produced by the combination of fossil fuels, comprising:

a tubular housing having an inlet end portion for receiving said exhaust gas and an outlet end portion for permitting said gas to exit said housing;

a sleeve made of a material including calcium carbonate, said sleeve being received in said housing, said sleeve having an axial opening extending through its length defining a gas flow passageway between said housing's inlet and outlet end portions;

a corona wire axially extending through and substantially along the length of said opening in said sleeve, said corona wire being negatively charged in a manner so as to create an electric field for laterally repelling at least some of said pollutants into said material making up said sleeve;

a positively charged electrode means, received in said housing, and substantially surrounding said sleeve, for attracting said pollutants laterally into said material making up said sleeve; and wherein said calcium carbonate in said sleeve material chemically reacts with and neutralizes said laterally displaced pollutants, said pollutants chemically altering said material into a substance that is environmentally safe for disposal.

2. The emission control unit specified in claim 1, wherein said corona wire is made of titanium.

3. The emission control unit specified in claim 1, including a separate terminal member positioned adjacent each outer end of said sleeve, wherein said corona wire extends between said terminals.

4. The emission control unit specified in claim 3, wherein each terminal member is substantially covered by an insulating material.

5. The emission control unit of claim 3, including an end space in said housing positioned immediately outwardly of each end of said sleeve, said terminal member extending through said end space.

6. The emission control unit specified in claim 5, wherein each terminal member is substantially covered by an insulating material.

7. The emission control unit specified in claim 1, wherein said sleeve material includes a metal catalyst mixed with said calcium carbonate.

8. The emission control unit specified in claim 7, wherein said metal catalyst is an iron oxide.

9. An emission control unit for use in removing certain pollutants, from an exhaust gas produced by the combustion of fossil fuels, comprising:

a tubular housing having an inlet end portion for receiving said exhaust gas and an outlet portion for permitting said gas to exit said housing;

a sleeve made substantially of calcium carbonate and received in said housing, said sleeve having an axial opening extending through its length defining a gas flow passageway between said housing's inlet and outlet end portions;

a corona wire axially extending through and substantially along the length of said opening in said sleeve, said corona wire being negatively charged for repelling at least some of said pollutants into said sleeve;

a positively charged electrode means, received in said housing and substantially surrounding said sleeve, for attracting at least some of said pollutants into said sleeve in cooperation with said corona wire; and wherein said calcium carbonate making up said sleeve retains, chemically reacts with, and chemically neutralizes said pollutants repelled and attracted into said sleeve by, respectively, said corona wire and said electrode means, said pollutants converting said calcium carbonate, over a period of time, into an environmentally safe material mostly made of gypsum.

10. The emission control unit specified in claim 9, wherein said corona wire is made of titanium.

11. The emission control unit specified in claim 9, including a separate terminal member positioned adjacent each end portion of said sleeve, wherein said corona wire extends between said terminals.

12. The emission control unit specified in claim 11, including an end space in said housing positioned immediately outwardly of each end of said sleeve, said terminal member extending through said end space.

13. The emission control unit specified in claim 9, wherein said calcium carbonate making up said sleeve includes a metal catalyst dispersed throughout said calcium carbonate.

14. The emission control unit specified in claim 13, wherein said metal catalyst is an iron oxide.

* * * * *

UNITED STATES PATENT AND TRADEMARK OFFICE
CERTIFICATE OF CORRECTION

PATENT NO. : 4,956,152
DATED : September 11, 1990
INVENTOR(S) : James R. Keough, Arthur E. Miller & Charles R. Schrader It is certified that error appears in the above-identified patent and that said Letters Patent is hereby corrected as shown below:

Col. 1, line 46, "Of" should be -- of --.

Col. 2, line 46, "sleeve 1B" should be -- sleeve 18 --.

Col. 3, line 28, "An exhaust gas" should be -- As exhaust gas --.

Col. 3, line 33, "he" should be -- the --.

Claim 1, col. 4, line 62, "combination" should be -- combustion --.

Claim 9, col. 5, line 42, delete the comma after "pollutants".

Signed and Sealed this

Twenty-fifth Day of February, 1992

Attest:

HARRY F. MANBECK, JR.

Attesting Officer

Commissioner of Patents and Trademarks